(12) United States Patent
Hedderly-Smith

(10) Patent No.: US 11,060,445 B1
(45) Date of Patent: Jul. 13, 2021

(54) HEAT EXCHANGER AND POWER SOURCE SYSTEM INCLUDING SAME

(71) Applicant: Honda Motor Co., Ltd., Tokyo (JP)

(72) Inventor: Arthur B. Hedderly-Smith, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/742,044

(22) Filed: Jan. 14, 2020

(51) Int. Cl.
   *F02B 29/04* (2006.01)
   *F02B 37/12* (2006.01)
   *F02D 41/00* (2006.01)

(52) U.S. Cl.
   CPC ...... *F02B 29/0468* (2013.01); *F02B 29/0456* (2013.01); *F02B 29/0462* (2013.01); *F02B 29/0475* (2013.01); *F02B 37/12* (2013.01); *F02D 41/0007* (2013.01)

(58) Field of Classification Search
   CPC .. F02B 29/0468; F02B 29/0456; F02B 37/12; F02B 29/0462; F02B 29/0475; F02D 41/0007
   See application file for complete search history.

(56) References Cited

U.S. PATENT DOCUMENTS

| | | | |
|---|---|---|---|
| 9,250,006 B2 | 2/2016 | Palm et al. | |
| 10,054,035 B2 | 8/2018 | Dieterle et al. | |
| 2008/0028757 A1 | 2/2008 | Eitel et al. | |
| 2014/0076289 A1* | 3/2014 | Ruona | F02M 29/04 123/542 |
| 2014/0083398 A1* | 3/2014 | Marceno | F28F 17/005 123/568.12 |
| 2014/0298845 A1* | 10/2014 | Palm | F25D 21/14 62/291 |
| 2016/0341107 A1* | 11/2016 | Dieterle | F02B 29/0475 |
| 2018/0252482 A1 | 9/2018 | Koo | |

FOREIGN PATENT DOCUMENTS

| | | |
|---|---|---|
| KR | 20160090192 A | 7/2016 |
| KR | 20180124288 A | 11/2018 |
| WO | WO2007120581 A1 | 10/2007 |

* cited by examiner

*Primary Examiner* — Brandon D Lee
(74) *Attorney, Agent, or Firm* — Kenealy Vaidya LLP

(57) ABSTRACT

An intercooler for cooling air exiting a turbocharger for delivery to an internal combustion engine can include an inlet, an outlet, a condensate collection space and a filter. The inlet can be configured to be in fluid communication with the turbocharger. The outlet can be configured to be in fluid communication with the internal combustion engine. The condensate collection space can be located between the inlet and the outlet. The filter can be located between the condensate collection space and the outlet such that water vapor in the air that condenses in the intercooler flows through the filter and into the condensate collection space in a first direction and condensed water flowing from the condensate collection space toward the outlet passes through the filter in a second direction before exiting through the outlet, and the second direction is different from the first direction.

20 Claims, 9 Drawing Sheets

HEAT EXCHANGER AND POWER SOURCE SYSTEM INCLUDING SAME

BACKGROUND

The disclosed subject matter relates to a heat exchanger for cooling heated air. More particularly, the disclosed subject matter relates to methods and apparatus that can cool compressed air that is compressed by a turbocharger before the compressed air enters the combustion chamber of an internal combustion engine.

A power source system for a vehicle can include an internal combustion engine and at least one compressor located in the air supply path at a position that is upstream of the combustion chamber of the engine. The compressor can be driven by the crankshaft of the engine (also referred to as a supercharger) or the compressor can be driven by the exhaust gas exiting the combustion chamber (also referred to as a turbocharger or a turbo-supercharger). In addition to increasing pressure and density of the compressed air, the compressor can increase the temperature of the compressed air.

The power source system can include a heat exchanger that is located in the air supply path between the compressor and the combustion chamber and cools the compressed air. The heat exchanger can be configured to transfer heat from the compressed air to the ambient air (also referred to as an air-to-air heat exchanger). Alternatively, the heat exchanger can be configured to transfer heat from the compressed air to the engine coolant or other liquid (also referred to as an air-to-water heat exchanger or an air-to-liquid heat exchanger). Thus, the temperature of the compressed air that enters the combustion chamber of the engine can be reduced, and the efficiency, durability and reliability of the engine can be enhanced, while the emission of undesirable emissions in the exhaust gas can be reduced compared to a power source system that does not cool the compressed air.

SUMMARY

Some embodiments are directed to an intercooler for cooling air exiting a turbocharger for delivery to an internal combustion engine. The intercooler can include an inlet, an outlet, a condensate collection space and a filter. The inlet can be configured to be in fluid communication with the turbocharger. The outlet can be configured to be in fluid communication with the internal combustion engine. The condensate collection space can be located between the inlet and the outlet. The filter can be located between the condensate collection space and the outlet such that water vapor in the air that condenses in the intercooler flows through the filter and into the condensate collection space in a first direction and condensed water flowing from the condensate collection space toward the outlet passes through the filter in a second direction before exiting through the outlet, and the second direction is different from the first direction.

Some embodiments are directed to a power source system for a vehicle. The power source system can include an internal combustion engine, a turbocharger, and an intercooler. The internal combustion engine can include at least one combustion chamber, an intake passage and an exhaust passage. The intake passage can be in selective fluid communication with the combustion chamber and configured to supply air to the at least one combustion chamber. The exhaust passage can be in selective fluid communication with the combustion chamber such that exhaust gas exiting the combustion chamber enters the exhaust passage. The turbocharger can be in fluid communication with ambient air and the exhaust passage such that the exhaust gas flowing from the exhaust passage into the turbocharger causes the turbocharger to compress the ambient air that enters the turbocharger. The intercooler can include an inlet, an outlet, a first charge air passage and a second charge air passage, a condensation collection space and a filter. The inlet can be in fluid communication with each of the turbocharger and the intake passage such that compressed air exiting the turbocharger enters the intercooler. The outlet can be in fluid communication with the intake passage. The first and second charge air passages can be in fluid communication with each of the inlet and the outlet and configured to transfer heat from the compressed air flowing through the first and second charge air passages to a heat sink. The condensate collection space can be between the second charge air passage and the outlet. The filter can be located between the condensate collection space and the outlet. The filter can be configured such that water vapor in the compressed air that condenses in the first charge air passage flows through the filter and into the condensate collection space in a first direction, condensed water entrained in air flowing from the second charge air passage and through the condensate collection space enters the filter in a second direction different from the first direction, and a flow rate of condensed water entrained in the air exiting from the filter in the second direction is less than a flow rate of condensed water entrained in the air flowing in the second direction before entering the filter.

Some embodiments are directed to a heat exchanger that can include an inlet, an outlet, a plurality of heated air passages, a plurality of cooling fluid paths, an outlet, a condensate collection space and a filter. The inlet can be configured to be in fluid communication with heated air. The plurality of heated air passages can be in fluid communication with the inlet such that heated air entering the inlet passes through the heated air passages. The plurality of heated air passages can include a first heated air passage. The plurality of cooling fluid paths can guide cooling fluid along and outside of a respective one the heated air passages such that heat is transferred from the heated air flowing through each of the heated air passages to the cooling fluid flowing along a respective one of the cooling fluid paths The outlet can be configured to be in fluid communication with each of the heated air passages. The condensate collection space can be spaced away from the first heated air passage and the outlet and configured to pool water vapor that condenses out of the heated air flowing into the first heated air passage. The filter can be located between the condensate collection space and the outlet such that water vapor that condenses in the first heated air passage flows through the filter and into the condensate collection space in a first direction, condensed water entrained in the heated air flowing through the condensate collection space enters the filter in a second direction that is different from the first direction, and a flow rate of condensed water entrained in the heated air that exits from the filter is less than a flow rate of condensed water entrained in the heated air that enters the filter.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
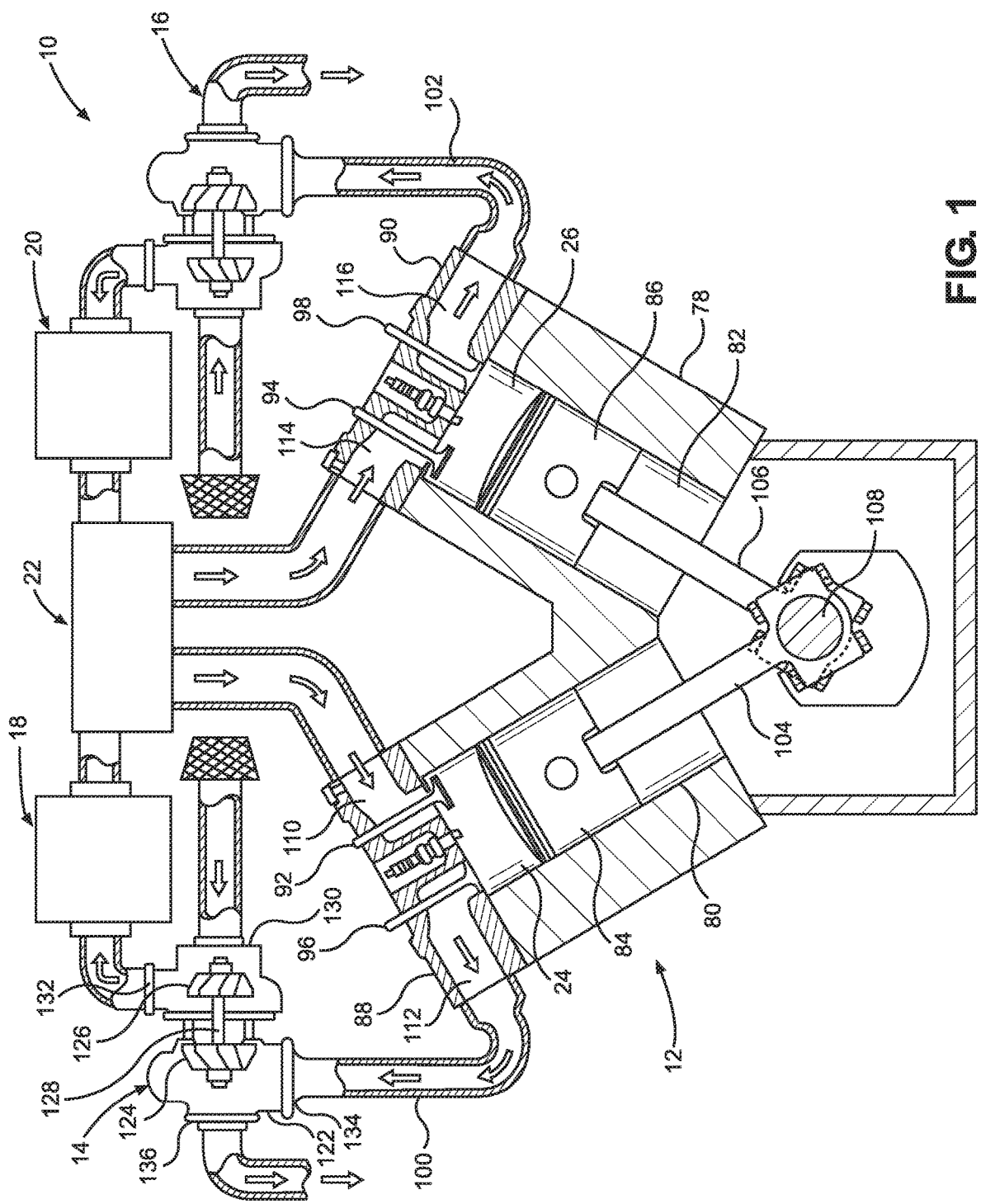
FIG. 1 is a cross-sectional and schematic view of a power supply system made in accordance with principles of the disclosed subject matter.

FIG. 1 illustrates an embodiment of a power supply system 10 for a vehicle made in accordance with principles of the disclosed subject matter. The power supply system 10 can include an internal combustion engine 12, a pair of turbochargers 14, 16, and a pair of heat exchangers 18, 20. The engine 12 can include an intake manifold 22 that is in fluid communication with each of the heat exchangers and the combustion chamber of the engine 12. The heat exchangers 18, 20 can also be referred to as intercoolers or as aftercoolers.

Exhaust exiting the combustion chambers of the engine 12 can be routed to a respective one of the turbochargers 14, 16. The turbochargers 14, 16 can be configured to compress ambient air that enters the turbochargers 14, 16. Compressed air exiting the turbochargers 14, 16 can enter a respective one of the heat exchangers 18, 20. The heat exchangers 18, 20 can be configured to transfer heat from the compressed air to ambient air or other heat sink medium such as but not limited to water or antifreeze that passes through the heat exchangers 18, 20. The compressed and cooled air can then be routed to the combustion chambers 24, 26 of the engine 12 by the intake manifold 22.

The ambient air that is compressed by the turbochargers 14, 16 can include water vapor. If the humidity of the compressed air is relatively high, the volumetric flow rate of the compressed air through the heat exchangers 18, 20 is relatively low, and/or the suction pressure in the air intake path of the engine 12 is relatively low, at least a portion of the water vapor in the compressed air can condense as the compressed air is cooled in the heat exchangers 18, 20. This condensation can pool up or collect in the heat exchangers 18, 20, which are part of the air intake path for the engine 12. Under low engine load conditions (such as but not limited to steady state driving or idling) the air intake pressure can be low enough that it allows a large amount of water vapor to condense and pool up or collect in the heat exchangers 18, 20. Under heavy engine load conditions (such as but not limited to accelerating on a highway on-ramp or passing another vehicle on a highway), the intake pressure can rise enough that the intake pipe suctions up at least some of the condensed water that has pooled or collected in the heat exchangers 18, 20. If the amount of condensed water that is entrained in the compressed air is large enough, the condensed water can cause a misfire in one or more of the combustion chambers of the engine 12.

Figure 2:
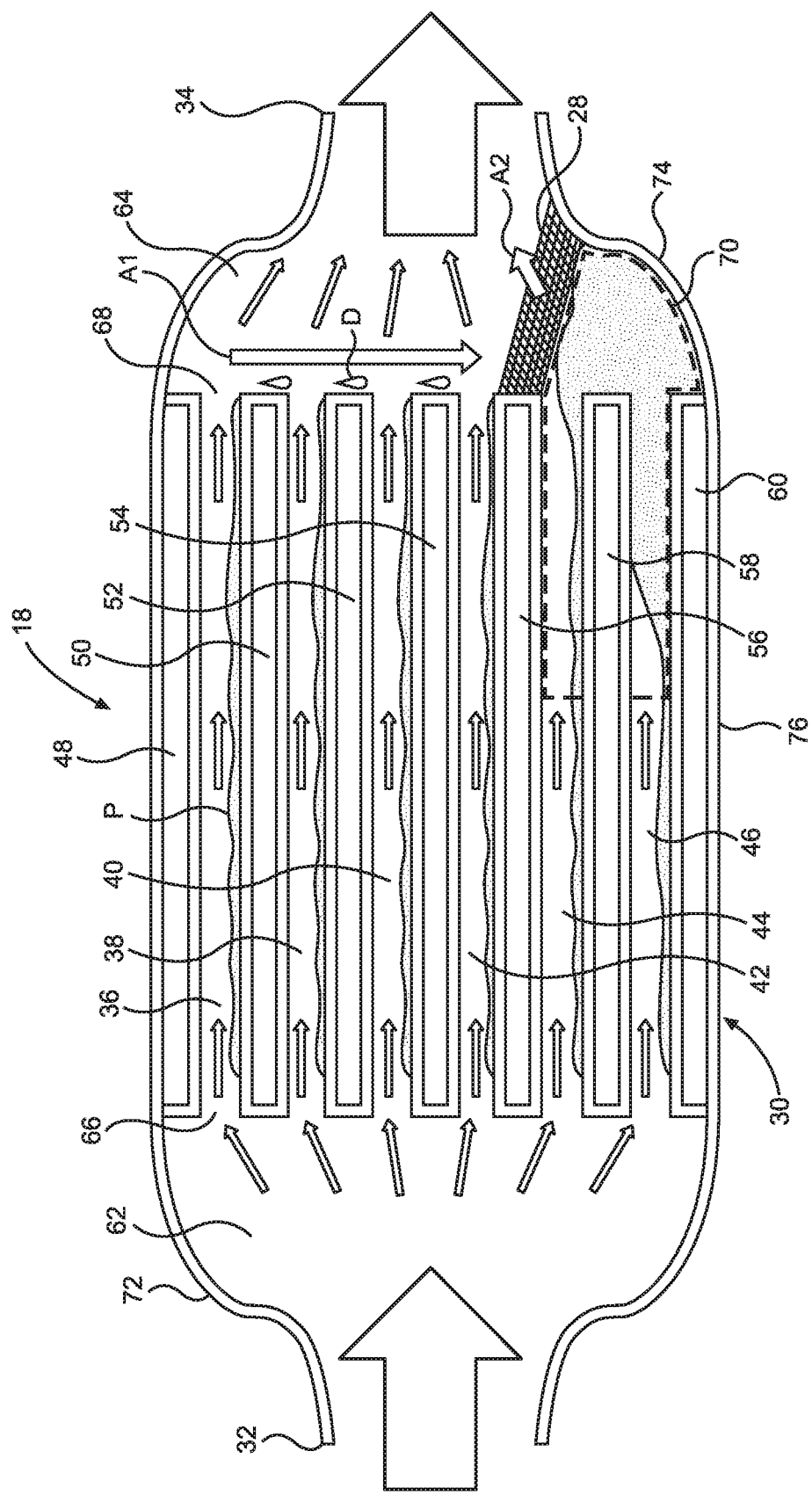
FIG. 2 is a cross-sectional and schematic view of a heat exchanger of the power supply system of FIG. 1.

FIG. 2 schematically illustrates the first heat exchanger 18 of FIG. 1 in cross-section. The second heat exchanger 20 can have the same or similar structure as the first heat exchanger 18.

In accordance with the disclosed subject matter, each of the heat exchangers 18, 20 can include a filter 28 inside each of the heat exchangers 18, 20 that is positioned between a collection space or pool of condensed water and the outlet of the heat exchangers 18, 20. The filter 28 can be any appropriate structure and formed from any appropriate material that lets condensed water falling from a first portion of each of the heat exchangers 18, 20 to filter through in a manner analogous to water passing through a coffee filter, but would limit the rate at which the condensed water passes through the filter 28 when subjected to a high suction or vacuum pressure created by the engine 12 during a high engine load condition. For example, the filter 28 can include a plurality of very fine size openings in some mesh such that the size of the water droplets passing through the filter limits the flow rate of the condensed water through the filter. Alternative embodiments can include a filter 28 configured such that condensed water that enters the filter 28 sticks to multiple strands/surfaces of a thicker material via surface tension. For example, the filter 28 can be made from steel-wool in a bundle such that the surface tension or other physical property of the filter 28 and/or the water would cause at least some of the water that enters the filter 28 to collect on the filter 28 and not pass through filter 28. Thus, the volume or mass of water that enters the combustion chamber per unit time can be maintained at a level that can advantageously address possible misfires in the combustion chamber. Specifically, the filter 18 can be located in the heat exchanger 18 and configured such that the flow rate of condensed water that is entrained in the compressed air that exits from the filter 18 can be less than the flow rate condensed water that is entrained in the compressed air that exits from the filter 18. The flow rates can be mass flow rates or volumetric flow rates.

The first heat exchanger 18 can include a core 30, an inlet 32 and an outlet 34. The core 30 can include a plurality of charge air passages 36, 38, 40, 42, 44, 46, a plurality of ambient air passages 48, 50, 52, 54, 56, 68, 60, an entrance chamber 62 and an exit chamber 64. The inlet 32 is in fluid communication with the first turbocharger 14 and the entrance chamber 62. The entrance chamber 62 can be in fluid communication with each of the charge air passages 36, 38, 40, 42, 44, 46. Each of the charge air passages 36, 38, 40, 42, 44, 46 can be in fluid communication with the exit chamber 64. The exit chamber 64 can be in fluid communication with the outlet 34. The charge air passages 36, 38, 40, 42, 44, 46 can alternate with the ambient air passages 48, 50, 52, 54, 56, 68, 60 such that each of the charge air passages 36, 38, 40, 42, 44, 46 is located between a respective pair of the ambient air passages 48, 50, 52, 54, 56, 68, 60.

Compressed air from the first turbocharger 14 can enter the first heat exchanger 18 through the inlet 32, and then flow into and through the entrance chamber 62, and then flow into and through the charge air passages 36, 38, 40, 42, 44, 46, and then flow into and through the exit chamber 64, and then exit the first heat exchanger 18 through the outlet 34 as indicated by the arrows pointing generally from left to right as viewed in FIG. 2. The compressed and cooled air that exits the heat exchanger 18 can flow into the intake manifold 22 where the compressed and cooled air can be directed toward the combustion chambers 24, 26.

Ambient air can flow through each of the ambient air passages 48, 50, 52, 54, 56, 68, 60 in a direction that is generally orthogonal to the direction in which the compressed air flows through the charge air passages 36, 38, 40, 42, 44, 46. The ambient air passages 48, 50, 52, 54, 56, 68, 60 can be configured to guide ambient air along and outside of a respective one of the charge air passages 36, 38, 40, 42, 44, 46. Thus, the first heat exchanger 18 can facilitate the transfer of heat from the compressed air to the ambient air while isolating the two fluid flows from each other.

Each of the charge air passages 36, 38, 40, 42, 44, 46 can include an inlet end 66 and an outlet end 68. Only the inlet end 66 and the outlet end 68 of the first charge air passage 36 is indicated in FIG. 2 for the clarity and simplicity of the drawing.

FIG. 2 schematically illustrates a pool P of condensed water on an upper side of each of the charge air passages 36, 38, 40, 42, 44, 46 for purposes of the description. One or more of the charge air passages 36, 38, 40, 42, 44, 46 may be devoid of a pool P. Alternatively, one or more of the charge air passages 36, 38, 40, 42, 44, 46 can include a plurality of pools P spaced apart along the upper surface. Further, water vapor in the compressed air can condense onto the lower surface of any number of the compressed air passages 36, 38, 40, 42, 44, 46.

At lower intake pressures and/or volumetric flows rates, the condensed water can be pushed along any number of the charge air passages 36, 38, 40, 42, 44, 46. However, when the condensed water reaches the exit end 68 of the charge air passages 36, 38, 40, 42, 44, 46, the condensed water drops D can fall out of the airflow and pool or collect in a condensate collection space 70 indicated in phantom. In the exemplary embodiment, the condensate collection space 70 can extend into each of the fifth and sixth charge air passages 44, 46 and can extend into a lower portion of the exit chamber 64. However, the shape and extent of the condensate collection space 70 is schematically depicted in FIG. 2 and can have any shape or extent as permitted by the structure of the core 30 of the first heat exchanger 18 and can vary in size and/or shape as the amount of condensed water collected or pooled within the first heat exchanger 18 varies.

The filter 28 can be advantageously located between the condensation collection space 70 and the outlet 34. Here, a portion of the condensed water flowing from the condensate collection space 70 toward the outlet 34 can pass through while another portion is prevented by the filter 28 from exiting through the outlet 34. Thus, the filter 28 can regulate the flow rate of entrained water that reaches the combustion chambers 24, 26.

Further, the filter 28 can be advantageously located between the condensation collection space 70 and another portion of the core 30, such as but not limited to the outlet end 68 of each of the first, second, third and fourth charge air passages 36, 38, 40, 42, such that the water droplets D that fall from this other portion of the core 30 can fall onto the filter 28. The filter 28 can permit these falling water droplets D to gradually pass through the filter 28 similar in manner to water passing through a coffee filter and enter into the condensate collection space 70. Thus, the filter 28 can permit water vapor in the compressed air that condenses in the core 30 to flow through the filter 28 and into the condensate collection space 70 in a first direction indicated by the arrow A1.

Further, the filter 28 can permit a portion of the entrained condensed water flowing from the condensate collection space 70 toward the outlet 34 to pass through the filter 28 in a second direction indicated by the arrow A2 before exiting through the outlet 34. The second direction (arrow A2) is different from the first direction (arrow A1). For example, compressed air flowing through the fifth and sixth charge air passages 44, 46 can pass through the condensate collection space and entrain some or all of the condensate water contained in the condensate collection space 70. The compressed air and entrained water can enter the filter 28 in the second direction (arrow A2) where the filter 28 can regulate the flow rate of entrained water such that the flow rate of the entrained water that exits the filter 18 in the second direction (arrow A2) is less than the flow rate of entrained water that flows in the second direction (arrow A2) before entering the filter 18.

Each of the first, second, third and fourth charge air passages 36, 38, 40, 42 can be spaced away from the condensate collection space 70. Thus, compressed air flowing through the first, second, third and fourth charge air passages 36, 38, 40, 42 can bypass the filter 28 and flow into the outlet 34 without passing through the filter 28. Further, the filter 28 can be connected to the exit end 68 of the fourth charge air passage 42.

The first heat exchanger 18 can include an entrance chamber wall 72 and an exit chamber wall 74. The entrance chamber wall 72 can extend from the inlet 32 to the ambient air passages 48, 50, 52, 54, 56, 58, 60. The exit chamber wall 74 can extend from the outlet 34 to the ambient air passages 48, 50, 52, 54, 56, 58, 60. The filter 28 can be connected to and extend from each of the exit chamber wall 74 and the exit end of the fourth charge air passage 42. The filter 28 can be connected to and extend from a location on the exit chamber wall 74 that is spaced away from and upstream of the outlet 34. Thus, compressed air flowing through each of the fifth and sixth charge air passages 44, 46 can pass through the filter 28 before exiting the first heat exchanger 18 via the outlet 34.

The charge and ambient air passages 36, 38, 40, 42, 44, 46, 48, 50, 52, 54, 56, 58, 60 can be stacked on top of each other in an alternating arrangement and the first heat exchanger 18 can be mounted to a vehicle such that the air flowing through the charge and ambient air passages 36, 38, 40, 42, 44, 46, 48, 50, 52, 54, 56, 58, 60 flows in a substantially horizontal direction. In this orientation, the first heat exchanger 18 can include a bottom end 76. The condensate collection space 70 can extend along the bottom end 76. Due to an inclination of the bottom end 76 relative to horizontal and/or the flow of compressed air through the first heat exchanger 18, the condensate collection space can be located primarily in a lower corner of the first heat exchanger 18. Further, the fifth and sixth air charge passages 44, 46 are located between the bottom end 76 and each of the first, second, third and fourth charge air passages 36, 38, 40, 42.

Referring to FIG. 1, the engine 12 can include an engine block 78, a plurality of cylinders 80, 82, a plurality of pistons 84, 86, a pair of cylinder heads 88, 90, a plurality of intake valves 92, 94, a plurality of exhaust valves 96, 98, a pair of exhaust pipes 100, 102, a plurality of connecting rods 104, 106 and a crankshaft 108. The pistons 84, 86 can reciprocate within the respective one of the cylinders 80, 82. The connecting rods 104, 106 and the crankshaft 108 can be configured to convert the reciprocating motion of the pistons 84, 86 into rotary motion of the crankshaft 108.

The first combustion chamber 24 can be in the first cylinder 80 and can be bounded by the first piston 84 and the first cylinder head 88. The second combustion chamber 26 can be in the second cylinder 82 and can be bounded by the second piston 86 and the second cylinder head 90.

The first cylinder head 88 can include a first intake port 110 and a first exhaust port 112. The second cylinder head 90 can include a second intake port 114 and a second exhaust port 116. The intake valves 92, 94 can selectively open and close fluid communication between the respective one of the intake ports 110, 114 and the respective one of the combustion chambers 24, 26. FIG. 1 shows the intake valves 92, 94 in the opened position. The exhaust valves 96, 98 can selectively open and close fluid communication between the respective one of the exhaust ports 112, 116 and the respective one of the combustion chambers 24, 26. FIG. 1 shows the exhaust valves 96, 98 in the closed position.

The intake manifold 22 can include a plurality of intake paths 118, 120 that are in fluid communication with a respective one of the intake ports 110, 114 such that compressed and cooled air exiting the heat exchangers 18, 20 can enter the intake ports 110, 114. The first intake path 118 and the first intake port 110 can be referred to collectively as a first intake passage and the second intake path 120 and the second intake port 114 can be referred to collectively as a second intake passage. As shown by the arrows, compressed and cooled air can flow from the intake manifold 22 into the intake passages and into the combustion chambers 24, 26 when the intake valves 92, 94 are in the opened position. Thus, the intake passages can be in selective fluid communication with the respective one of the combustions chambers 24, 26.

The first exhaust path 100 and the first exhaust port 112 can be referred to collectively as a first exhaust passage and the second exhaust path 102 and the second exhaust port 116 can be referred to collectively as a second exhaust passage. Exhaust gas can flow from the combustion chambers 24, 26 into the respective one of the exhaust passages and then into a respective one of the turbochargers 14, 16 when the respective one of the exhaust valves 96, 98 is in the opened position. Thus, the exhaust passages can be in selective fluid communication with the respective one of the combustions chambers 24, 26. The exhaust passages can be in fluid communication with a respective one of the turbochargers as indicated by the arrows.

A description of the first turbocharger 14 is provided below with the understanding that the second turbocharger 16 can be identical in structure to the first turbocharger 16.

The first turbocharger can include a housing 122, a turbine 124, a compressor 126 and a shaft 128. Each of the turbine 124 and the compressor 126 can be coupled to the shaft 128 to rotate in unison with the shaft 128. The shaft 128 can be rotatably supported in the housing 122. The housing 122 can include an ambient air inlet 130, a compressed air outlet 132, an exhaust gas inlet 134 and an exhaust gas outlet 136.

Exhaust gas exiting the combustion chamber 24 can flow through the cylinder head 88 and along the first exhaust path 100 and then through the exhaust gas inlet 134 when the first exhaust valve 96 is in the opened position. Exhaust gas can flow through the housing 122 such that the flowing exhaust gas rotates the turbine 124 and exits the housing 122 via the exhaust gas outlet 136 as indicated by the arrows.

Since the turbine 124 and the compressor 126 are connected to each other by the shaft 128, rotation of the turbine 124 causes the compressor 126 to rotate. Rotation of the compressor 126 draws ambient air into the housing 122 via the ambient air inlet 130. Ambient air flowing into the compressor 126 from the housing 122 is compressed and heated and directed to the inlet 32 of the first heat exchanger 18 via the compressed air outlet 132.

Thus, in this configuration the heat exchangers 18, 20 will then cool the compressed air exiting the turbochargers 14, 16 and can also regulate the amount of water that is suctioned into the combustion chambers 24, 26 of the engine 12.

Figure 3:
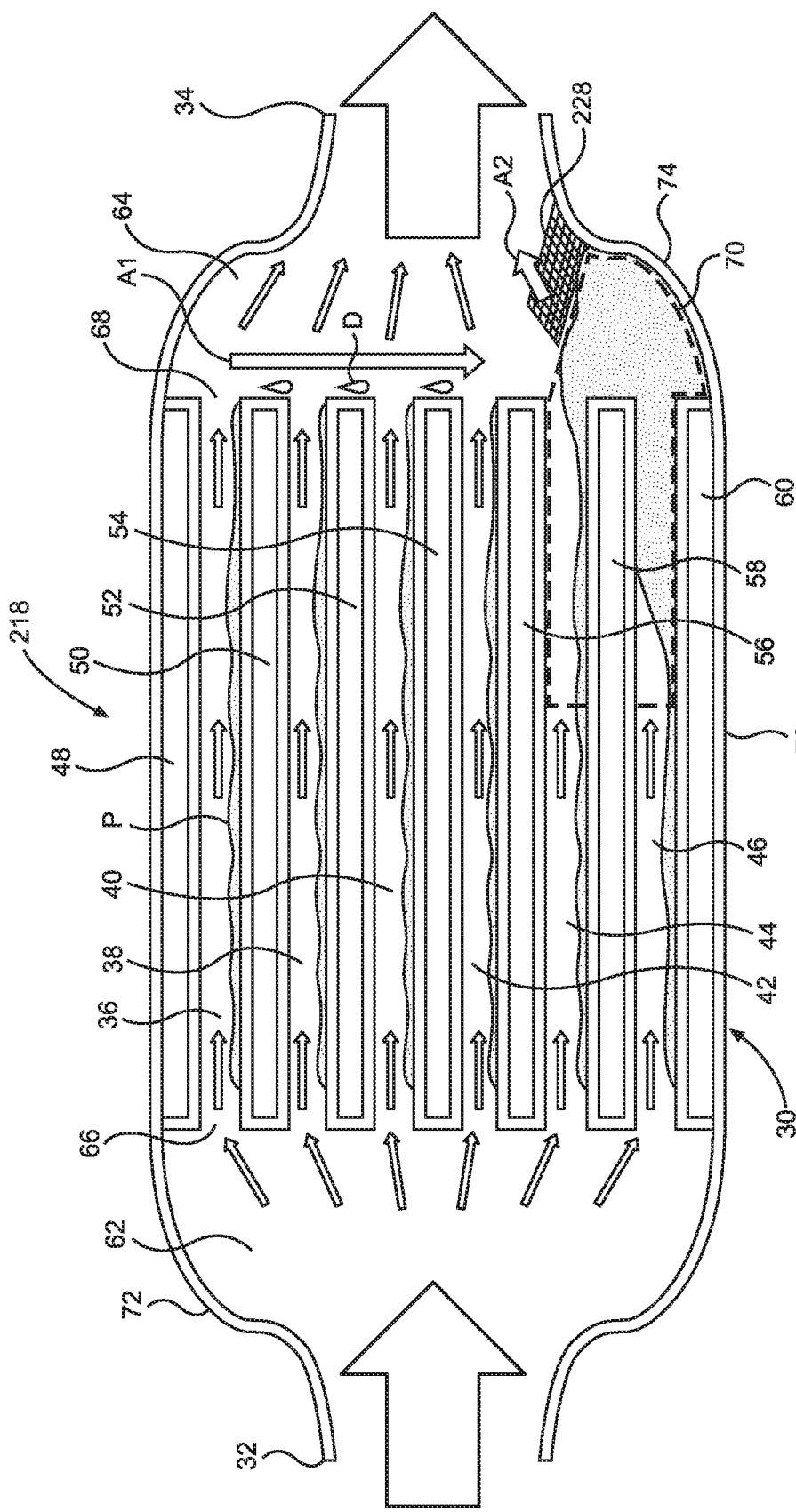
FIG. 3 is a cross-sectional and schematic view of a second embodiment of a heat exchanger of the power supply system of FIG. 1.

FIG. 3 shows a second embodiment of a heat exchanger 218 that can include the structure to the heat exchanger 18 of FIG. 1, as indicated by the same reference numbers. The heat exchanger 218 can include a filter 228 instead of the filter 28 of FIG. 1. The filter 228 can be located between the outlet 34 and the condensation collection space 70 and connected to the exit chamber wall 74. The filter 228 can have a free end that is spaced away from all of the ambient air passages 50, 52, 54, 56, 58, 60. As a result, some of the water flowing in the first direction (arrow A1) can enter the condensate collection space 70 without passing through the filter 228. Further, some of the water entrained in the compressed air can flow in the second direction (arrow A2) through the condensate collection space 70 and enter the outlet 34 without flowing through the filter 228.

Figure 4:
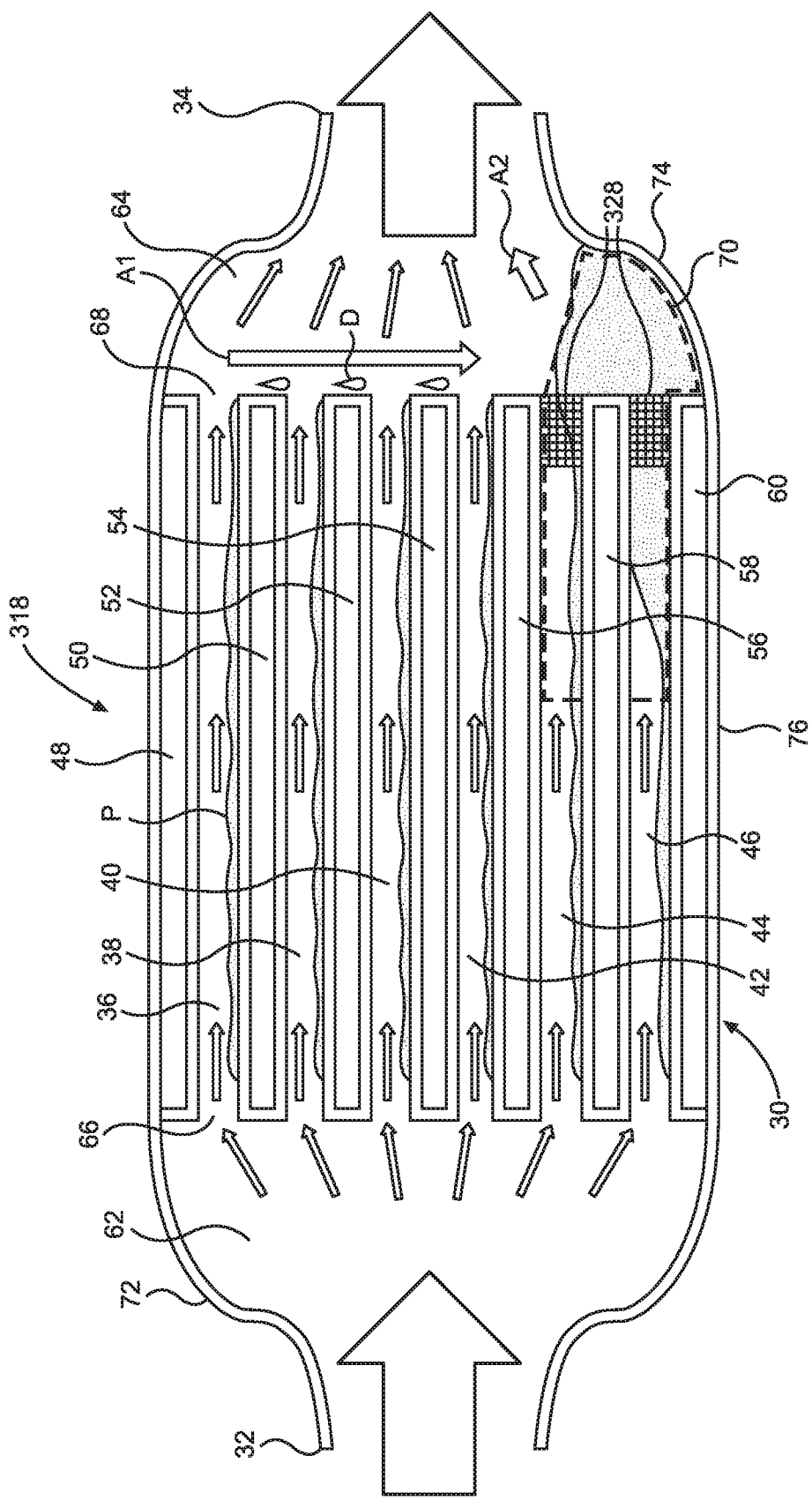
FIG. 4 is a cross-sectional and schematic view of a third embodiment of a heat exchanger of the power supply system of FIG. 1.

FIG. 4 shows a third embodiment of a heat exchanger 318 that can include the structure to the heat exchanger 18 of FIG. 1, as indicated by the same reference numbers. The heat exchanger 318 can include a filter 328 instead of the filter 28 of FIG. 1. The filter 328 can be connected to each of the fifth ambient air passage 56, the sixth ambient air passage 58 and the seventh ambient air passage 60 such that the filter 328 spans across the fifth charge air passage 44 and sixth charge air passage 46. The filter 328 can be positioned within condensate collection space 70. As a result, the water flowing in the first direction (arrow A1) can enter the condensate collection space 70 without passing through the filter 228. Further, water entrained in the compressed air can flow in the second direction (arrow A2) through the condensate collection space 70 and enter the filter 328 before entering the outlet 34.

Figure 5:
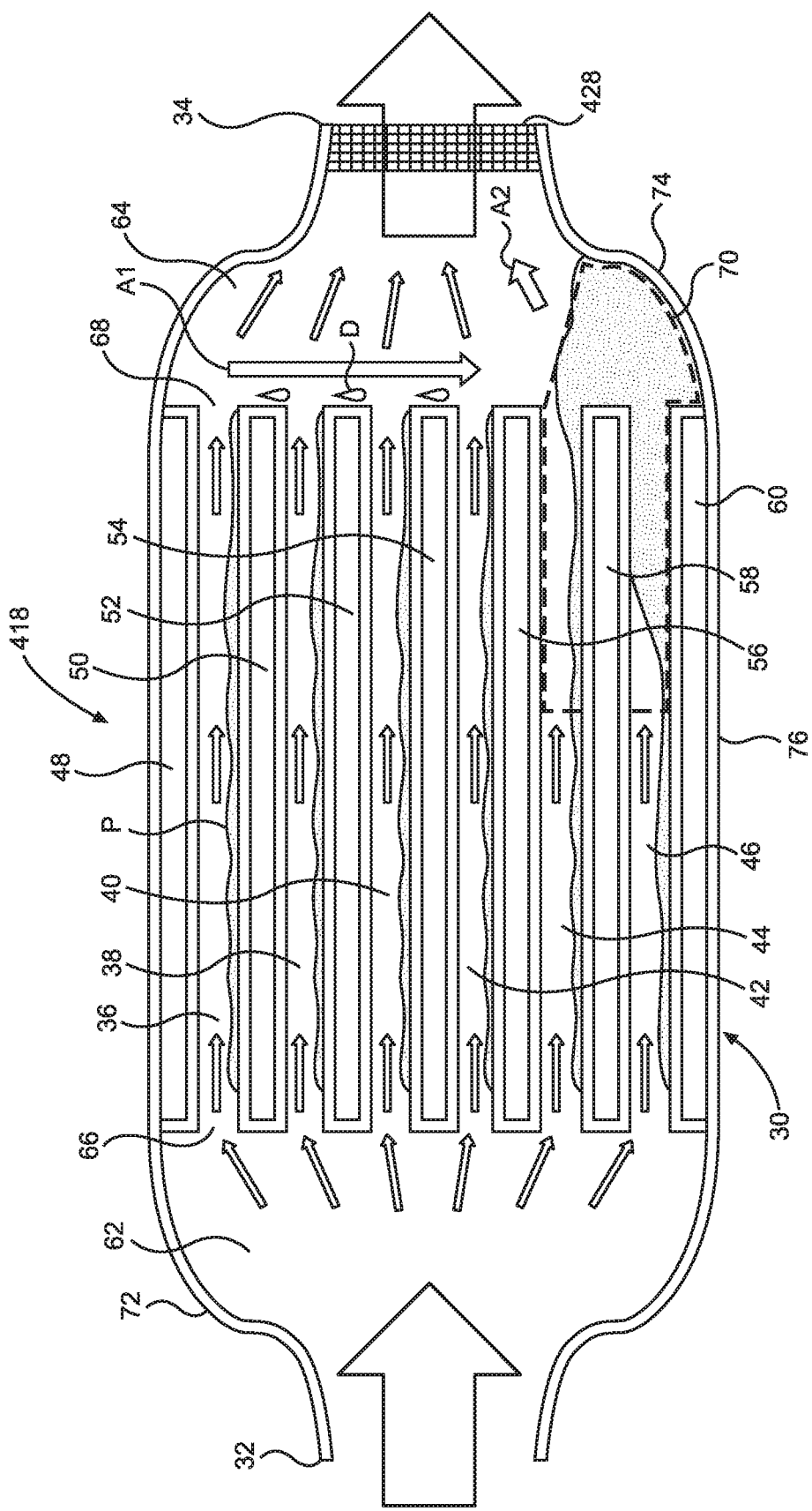
FIG. 5 is a cross-sectional and schematic view of a fourth embodiment of a heat exchanger of the power supply system of FIG. 1.

FIG. 5 shows a fourth embodiment of a heat exchanger 418 that can include the structure to the heat exchanger 18 of FIG. 1, as indicated by the same reference numbers. The heat exchanger 418 can include a filter 428 instead of the filter 28 of FIG. 1. The filter 428 can be positioned in the outlet 34 to span the entirety of the outlet 34. As a result, the water flowing in the first direction (arrow A1) can enter the condensate collection space 70 without passing through the filter 228. Further, water entrained in compressed air can flow in the second direction (arrow A2) through the condensate collection space 70 and enter the filter 328 before exiting the outlet 34.

Figure 6:
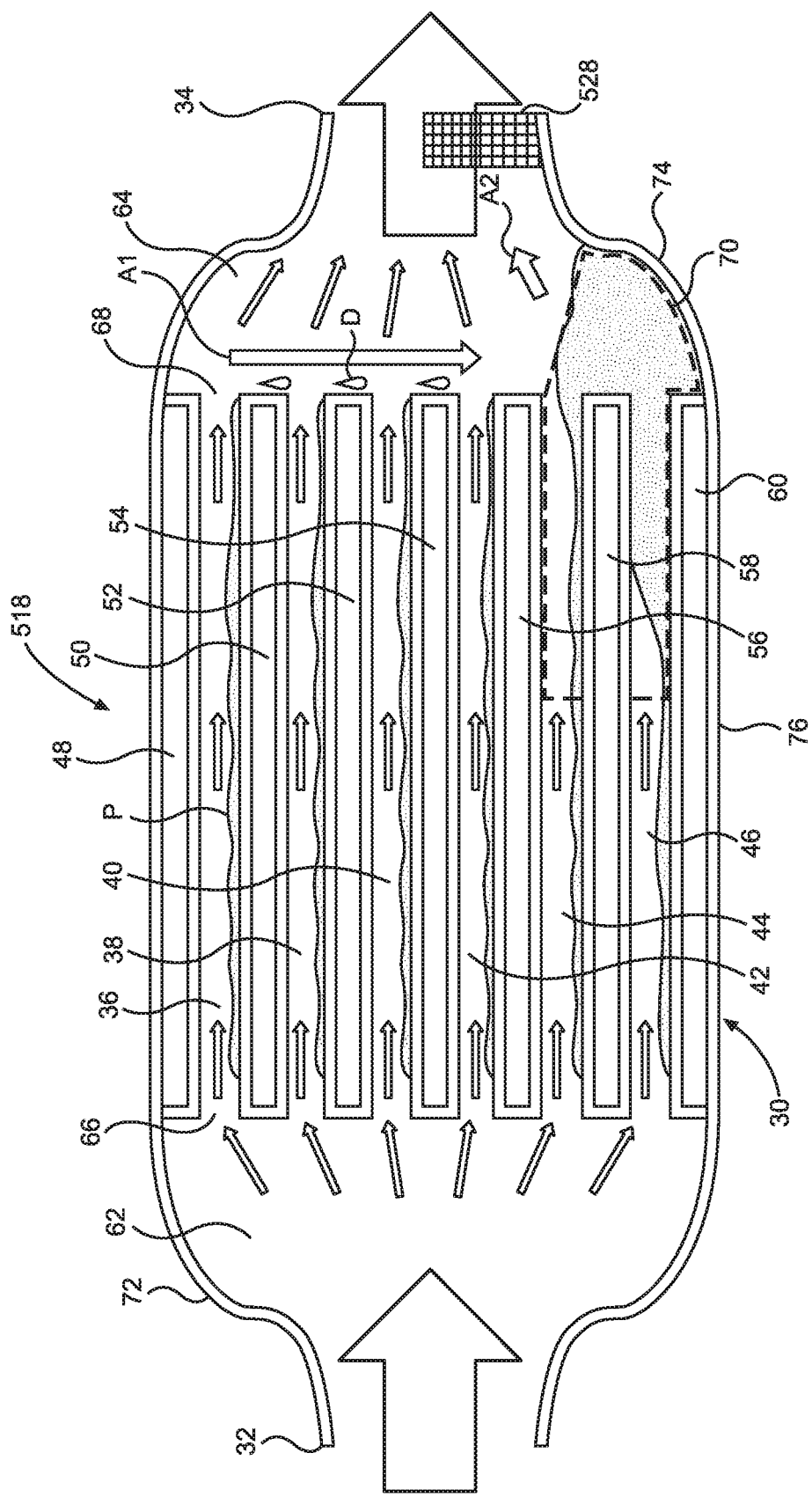
FIG. 6 is a cross-sectional and schematic view of a fifth embodiment of a heat exchanger of the power supply system of FIG. 1

FIG. 6 shows a fifth embodiment of a heat exchanger 518 that can include the structure to the heat exchanger 18 of FIG. 1, as indicated by the same reference numbers. The heat exchanger 518 can include a filter 528 instead of the filter 28 of FIG. 1. The filter 528 can be positioned in the outlet 34 to span a portion of the outlet 34 such that the filter 528 includes a free end spaced away from the inner surface of the outlet 34. As a result, water flowing in the first direction (arrow A1) can enter the condensate collection space 70 without passing through the filter 228. Further, some of the entrained water in the compressed air can flow in the second direction (arrow A2) through the condensate collection space 70 and enter the filter 328 before exiting the outlet 34 and some of the water entrained in the compressed air can flow in the second direction (arrow A2) through the condensate collection space 70, bypass the filter 328 and enter the outlet 34 without being filtered.

Figure 7:
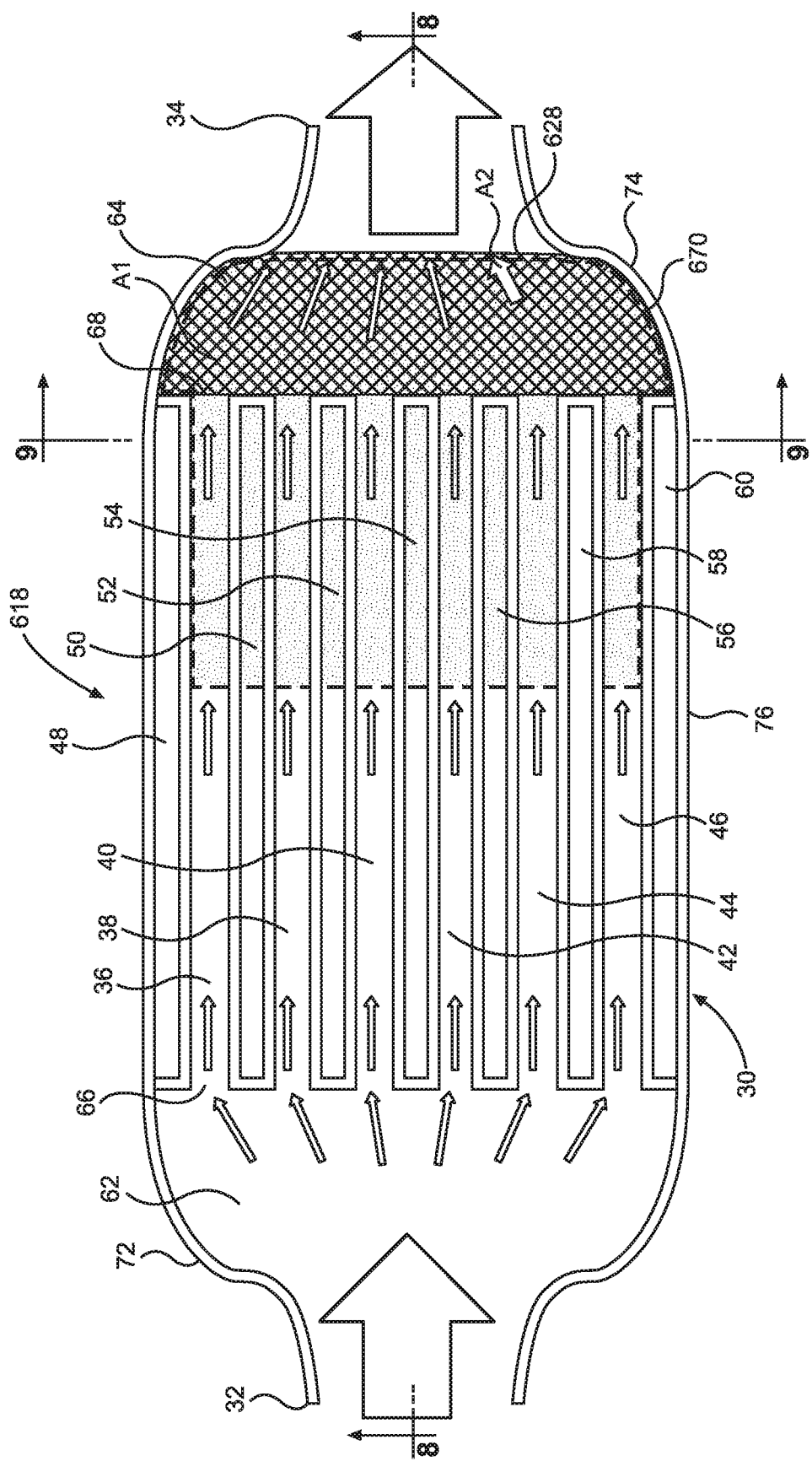
FIG. 7 is a cross-sectional and schematic view of a sixth embodiment of a heat exchanger of the power supply system of FIG. 1
Figure 8:
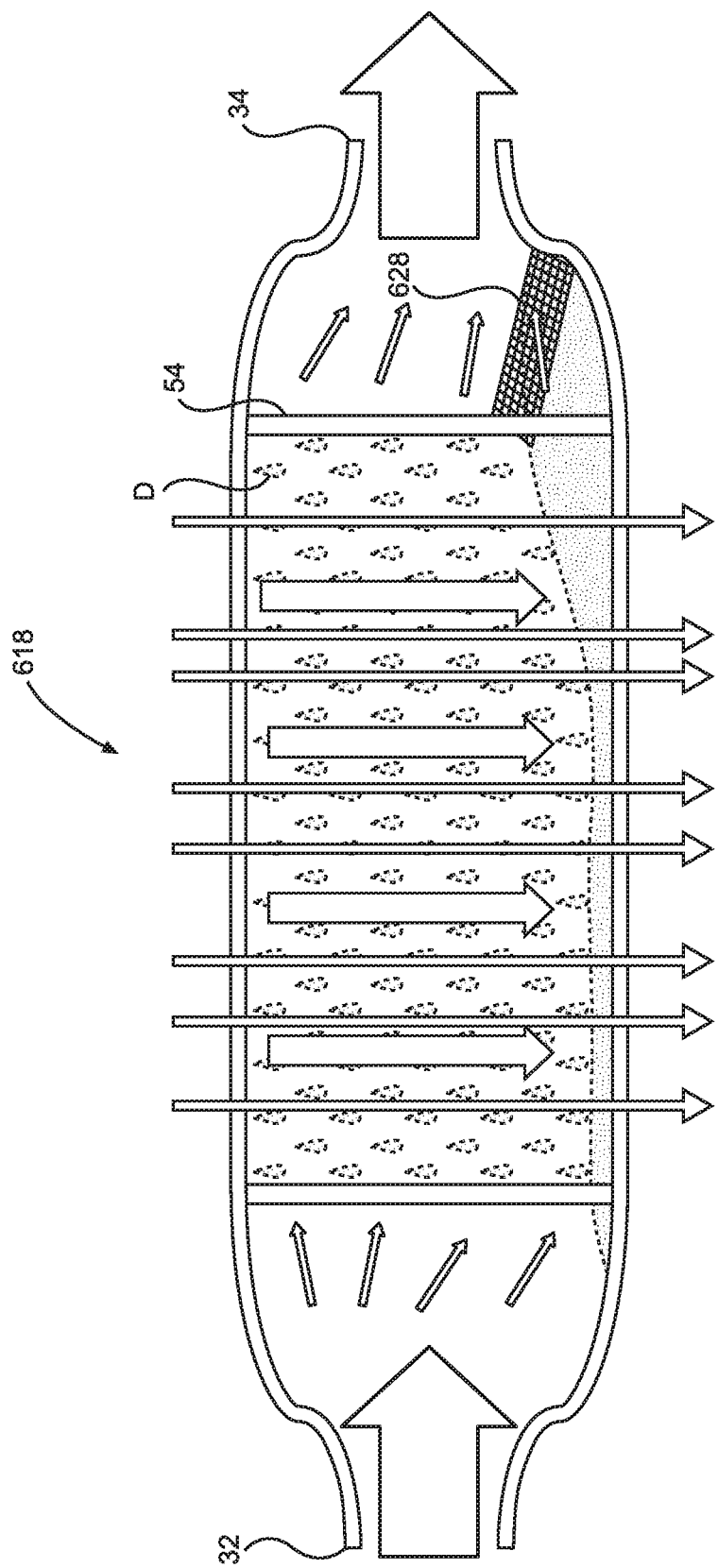
FIG. 8 is a cross-sectional and schematic view taken along line 8-8 of FIG. 7
Figure 9:
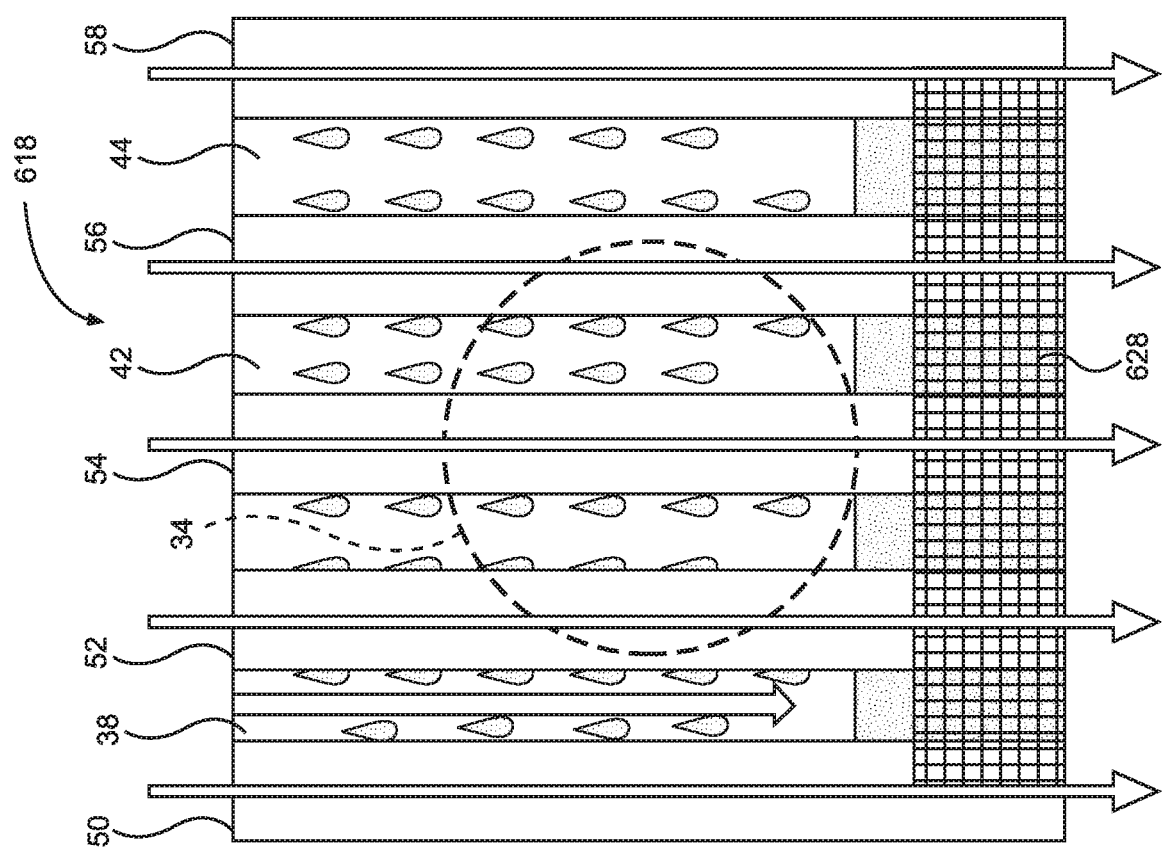
FIG. 9 is a cross-sectional and schematic view taken along line 9-9 of FIG. 7.

FIGS. 7-9 show a sixth embodiment of a heat exchanger 618 that can include the structure to the heat exchanger 18 of FIG. 1, as indicated by the same reference numbers. However, the orientation of heat exchanger 618 can be different than that of the heat exchanger 18 of FIG. 1. Referring to FIGS. 8 and 9, the heat exchanger 618 can be orientated such that the ambient air passages 48, 50, 52, 54, 56, 60 extend in a vertical direction as compared to the horizontal orientation of the ambient air passages 48, 50, 52, 54, 56, 60 of the heat exchanger 18 of FIG. 2. Further, the condensate collection space 70 can extend into each of the charge air passages 36, 38, 40, 42, 44, 46, as shown in FIG. 7.

In each of the alternate embodiments illustrated in FIGS. 3-9, the filter can affect the flow rate of entrained water such that the flow rate of water entrained in the compressed air that enters the outlet 34 is less than the flow rate of water entrained in the compressed air that enters the filter.

While certain embodiments of the invention are described above, it should be understood that the invention can be embodied and configured in many different ways without departing from the spirit and scope of the invention.

For example, embodiments are disclosed above in the context of the power supply system shown in FIG. 1 that includes a pair of turbochargers and a pair of heat exchangers. However, any appropriate number of turbochargers and heat exchangers can be implemented. For example, alternate embodiments can include a single turbocharger and/or a single heat exchanger. In another alternate embodiment, the heat exchanger can be located between and in fluid communication with a pair of turbochargers, one upstream from the heat exchanger and one downstream of the heat exchanger with respect to the flow path of the compressed air. However, the above alternative embodiments are merely provided for exemplary purposes, and as indicated above, embodiments are intended to cover any type of heat exchanger and any type of power supply system that includes a heat exchanger disclosed above.

Exemplary embodiments can include a heat exchanger having any number of charge air passages and any number of ambient air passages in order to achieve the desired heat exchange rate for the compressed air.

Although the exemplary embodiments of the heat exchanger shown in FIGS. 2-9 includes a condensate collection space located at the lower right corner, the condensate collection space can be located in any appropriate position within the heat exchanger that is space away from the outlet such that condensed water from the condensate collection space that is entrained in the compressed air passes through the filter before entering the outlet of the heat exchanger.

Exemplary embodiments are intended to include or otherwise cover any type of internal combustion engine such as but not limited to a reciprocating piston engine and a rotary piston engine. The internal combustion engine can include one or more cylinders. Alternate embodiments can include a multi-cylinder engine in which the cylinders are arrange in any one of a V-configuration, an in-line configuration, or a flat (or horizontally-opposed) configuration.

Exemplary embodiments are also intended to cover any type of compressor, such as but not limited to a supercharger, a multi-stage turbocharger, a variable geometry turbocharger, or a supercharger in combination with a turbocharger, for compressing the ambient air for delivery to the combustion chamber.

The geometry of the charge air passages and ambient air passages can also be significantly different from those depicted in the attached drawings and described above. For example, the ambient air passages could be aligned and parallel with the charge air passages such that the charge and ambient air travelling though all of the passages is parallel with respect to each other, and in opposite or same directions. Further, the ambient air passages could be replaced with other types of fluid passages, such as water or antifreeze passages that can be shaped similar to those shown in the attached drawings, or can be shaped in a totally different manner depending on application and design parameters. Further, instead of fluid-to-fluid heat exchange, electronic cooling devices could be used to cause heat transfer to occur in the charge air passages, and the ambient air passages could be eliminated.

The exemplary embodiments of the heat exchanger are described above in the context of an intercooler that is in fluid communication with a compressor such as a turbocharger or a supercharger. However, exemplary embodiments can include a heat exchanger that transfers heat from any heated fluid to any cooling medium.

What is claimed is:

1. An intercooler for cooling air exiting a turbocharger for delivery to an internal combustion engine, the intercooler comprising:
   an inlet configured to be in fluid communication with the turbocharger;
   an outlet configured to be in fluid communication with the internal combustion engine;
   a condensate collection space located between the inlet and the outlet; and
   a filter located between the condensate collection space and the outlet such that water vapor in the air that condenses in the intercooler flows through the filter and into the condensate collection space in a first direction and condensed water flowing from the condensate collection space toward the outlet passes through the filter in a second direction such that the condensed water passes through the filter twice before exiting through the outlet, and the second direction is different from the first direction.

2. The intercooler according to claim 1, further comprising:
   a first charge air passage in fluid communication with each of the inlet and the outlet; and
   a second charge air passage in fluid communication with each of the inlet and the outlet, wherein
   the water vapor that condenses in the first charge air passage passes through the filter in the first direction before entering the condensate collection space, and
   air flowing through the second charge air passage flows through the condensate collection space, entrains at least a portion of the condensed water, and passes through the filter in the second direction before passing through the outlet.

3. The intercooler according to claim 1, wherein
   the condensate collection space is located below the outlet, and the filter is located above the condensate collection space and below the outlet.

4. The intercooler according to claim 1, wherein
air flowing through the condensate collection space entrains a first volume of the condensed water in the condensate collection space and flows through the filter in the second direction, and
the filter is configured such that a flow rate of the condensed water entrained in the air exiting from the filter in the second direction is less than a flow rate of the condensed water entrained in the air flowing in the second direction before entering the filter.

5. The intercooler according to claim 1, wherein the filter is a mesh filter configured to limit a flow of entrained water through the filter such that a flow rate of the entrained water passing through the outlet is less than or equal to a predetermined threshold.

6. The intercooler according to claim 1, further comprising:
a charge air passage in fluid communication with each of the inlet and the outlet; and
a cooling fluid passage configured to guide cooling fluid along and outside of the charge air passage, wherein
the condensate collection space extends into the charge air passage such that air flowing in the charge air passage flows through the condensate collection space, and
air and condensed water exiting the condensate collection space enters the filter in the second direction, and
the filter collects or obstructs a portion of the condensed water entering the filter in the second direction.

7. The intercooler according to claim 1, further comprising:
a plurality of charge air passages, each of the charge air passages includes an inlet end and an outlet end, and the plurality of charge air passages includes a first charge air passage that is spaced away from the condensate collection space and a second charge air passage;
an entrance chamber wall forming an entrance chamber that is in fluid communication with the inlet and each of the charge air passages, and the entrance chamber extends along and abuts each of the inlet ends of the charge air passage;
an exit chamber wall forming an exit chamber that is in fluid communication with the outlet and each of the charge air passages, and the exit chamber extends along and abuts each of the outlet ends of the charge air passages;
a plurality of cooling fluid passages each extending between a respective pair of the charge air passages and configured to permit cooling fluid to flow along the outside of each of the respective pair of charge air passages, wherein
the condensate collection space extends into each of the second charge air passage and the exit chamber, and
the filter is connected to and extends from each of the exit end of the first charge air passage and the exit chamber wall, the filter is spaced below the first charge air passage, and the filter is spaced above each of the second charge air passage and the condensate collection space.

8. The intercooler according to claim 1, further comprising:
a plurality of first charge air passages in fluid communication with each of the inlet and the outlet;
a plurality of second charge air passages spaced below the first charge air passages and in fluid communication with each of the inlet and the outlet, wherein
the condensate collection space extends into at least one of the second charge air passages and is spaced away from each of the first charge air passages,
the filter is connected to and extends from one the first charge air passages and across the condensate collection space such that air flowing through any of the second charged air passages passes through the filter in the second direction before entering the outlet,
the filter configured such that air flowing through the condensate collection space entrains a first volume of the condensed water and enters the filter in the second direction, and
the filter is configured such that a flow rate of condensed water entrained in the air exiting from the filter in the second direction is less than a flow rate of condensed water entrained in the air flowing in the second direction before entering the filter.

9. The intercooler according to claim 8, wherein the filter is configured such that water vapor in the air that condenses in any of the first charge air passages flows through the filter in the first direction.

10. The intercooler according to claim 1, further comprising first, second, third and fourth charge air passages configured such that air flowing through the first and third charge air passages bypasses the filter and enters the outlet, and
such that air flowing through the second and fourth charge air passages flows through the filter in the second direction before entering the outlet.

11. The intercooler according to claim 1, wherein the filter is located below and spaced from an entryway to the outlet of the intercooler such that only a portion of air passing through the intercooler passes through the filter.

12. A power source system for a vehicle comprising:
an internal combustion engine including,
at least one combustion chamber,
an intake passage in selective fluid communication with the combustion chamber and configured to supply air to the at least one combustion chamber, and
an exhaust passage in selective fluid communication with the combustion chamber such that exhaust gas exiting the combustion chamber enters the exhaust passage;
a turbocharger in fluid communication with ambient air and the exhaust passage such that the exhaust gas flowing from the exhaust passage into the turbocharger causes the turbocharger to compress the ambient air that enters the turbocharger; and
an intercooler including,
an inlet in fluid communication with each of the turbocharger and the intake passage such that compressed air exiting the turbocharger enters the intercooler,
an outlet in fluid communication with the intake passage,
a first charge air passage and a second charge air passage in fluid communication with each of the inlet and the outlet and configured to transfer heat from the compressed air flowing through the first and second charge air passages to a heat sink,
a condensate collection space between the second charge air passage and the outlet, and
a filter located between the condensate collection space and the outlet, the filter is configured such that water vapor in the compressed air that condenses in the first charge air passage flows through the filter and into the condensate collection space in a first direction, condensed water entrained in air flowing from the second charge air passage and through the condensate collection space enters the filter in a second direction different from the first direction such that the condensed water passes through the filter twice, and a flow rate of condensed water entrained in the air exiting from the filter in the second direction is less than a flow rate of condensed water entrained in the air flowing in the second direction before entering the filter.

13. The power source system according to claim 12, wherein the condensate collection space extends into the second charge air passage and is spaced away from the first charge air passage.

14. The power source system according to claim 12, wherein the intercooler includes a plurality of ambient air passages.

15. The power source system according to claim 12, wherein
the intercooler includes a bottom end,
the outlet is spaced above the bottom end,
the first charge air passage is spaced above the bottom end,
the second charge passage is located between the first charge air passage and the bottom end,
the condensation collection space extends along the bottom end, and
the filter is spaced above the bottom end and below the outlet.

16. The power source system according to claim 12, wherein the filter is configured to collect a portion of the condensed water entrained in air passing though the filter in the second direction such that an amount of condensed water entrained in air passing through the filter in the second direction is less than an amount of condensed water entrained in air that enters the filter.

17. The power source according to claim 12, wherein the filter is located below and spaced from an entryway to the outlet of the intercooler such that only a portion of air passing through the intercooler passes through the filter.

18. A heat exchanger, comprising:
an inlet configured to be in fluid communication with heated air;
a plurality of heated air passages in fluid communication with the inlet such that heated air entering the inlet passes through the heated air passages, the plurality of heated air passages includes a first heated air passage;
a plurality of cooling fluid paths guiding cooling fluid along and outside of a respective one the heated air passages such that heat is transferred from the heated air flowing through each of the heated air passages to the cooling fluid flowing along a respective one of the cooling fluid paths;
an outlet configured to be in fluid communication with each of the heated air passages;
a condensate collection space spaced away from the first heated air passage and the outlet and configured to pool water vapor that condenses out of the heated air flowing into the first heated air passage; and
a filter located between the condensate collection space and the outlet such that,
water vapor that condenses in the first heated air passage flows through the filter and into the condensate collection space in a first direction,
condensed water entrained in the heated air flowing through the condensate collection space enters the filter in a second direction that is different from the first direction such that the condensed water passes through the filter twice, and
a flow rate of condensed water entrained in the heated air that exits from the filter is less than a flow rate of condensed water entrained in the heated air that enters the filter.

19. The heat exchanger according to claim 18, wherein the filter is configured to obstruct at least a portion of the condensed water entrained in the heated air that flows through the filter in the second direction.

20. The heat exchanger according to claim 18, wherein the filter is configured to collect at least a portion of the condensed water entrained in the heated air that is directed through the filter in the second direction.

* * * * *